United States Patent
Izawa (10) Patent No.: US 6,670,723 B2
(45) Date of Patent: Dec. 30, 2003

(54) IRRADIATION DIRECTION CONTROL APPARATUS FOR VEHICLE LAMP

(75) Inventor: Makoto Izawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 307 days.

(21) Appl. No.: 09/735,898

(22) Filed: Dec. 14, 2000

(65) Prior Publication Data

US 2002/0158514 A1 Oct. 31, 2002

(30) Foreign Application Priority Data

Dec. 14, 1999 (JP) .................................... P. 11-354116

(51) Int. Cl.$^7$ .................................................. B60L 1/00
(52) U.S. Cl. ...................... 307/10.1; 702/154; 362/464
(58) Field of Search ................................ 307/10.1, 9.1, 307/10.8; 326/464, 465, 466, 467, 468; 702/150, 154

(56) References Cited

U.S. PATENT DOCUMENTS

| | | | | |
|---|---|---|---|---|
| 5,182,460 A | * | 1/1993 | Hussman | .................... 307/10.8 |
| 5,184,024 A | * | 2/1993 | Hussmann et al. | ......... 307/10.8 |
| 5,191,530 A | | 3/1993 | Hussmann et al. | .... 364/424.05 |
| 5,877,680 A | * | 3/1999 | Okuchi et al. | ............... 340/468 |
| 5,907,196 A | | 5/1999 | Hayami et al. | ............ 307/10.8 |
| 6,229,263 B1 | * | 5/2001 | Izawa | ........................... 315/80 |
| 6,302,553 B1 | * | 10/2001 | Izawa | ......................... 362/465 |
| 6,343,869 B1 | * | 2/2002 | Kobayashi | .................. 362/464 |
| 6,401,020 B1 | * | 6/2002 | Neumann | ................... 307/10.8 |
| 6,438,478 B2 | * | 8/2002 | Toda et al. | ................. 307/10.8 |
| 6,480,806 B1 | * | 11/2002 | Bilz et al. | .................... 702/154 |

FOREIGN PATENT DOCUMENTS

| | | | |
|---|---|---|---|
| EP | 0 845 388 A1 | 6/1998 | ........... B60Q/1/115 |
| EP | 0 847 895 A2 | 6/1998 | ........... B60Q/1/115 |
| EP | 0 906 850 A2 | 4/1999 | ........... B60Q/1/115 |
| GB | 2 325 757 | 12/1998 | ........... B60Q/1/115 |

* cited by examiner

Primary Examiner—Gregory J. Toatley, Jr.
Assistant Examiner—Roberto J. Rios
(74) Attorney, Agent, or Firm—Sughrue Mion, PLLC (57) ABSTRACT

An irradiation direction control apparatus 1 for a vehicular lamp has a vehicle height detecting means 2 for detecting change in the height of an axle portion of at least one of front wheels and rear wheels. The detecting means 2 sends irradiation control means 4 detection information representing the detected change in the height. The irradiation control means 4 calculates a moving average value of data representing change in the height of the axle portion or representing the pitch angle every predetermined time period, and subsequently obtains a second moving average value of the calculated moving average. Further, the control means 4 generates a control signal according to the obtained moving average value, and controls the irradiation direction of the lamp 6 so that the irradiation direction thereof is maintained at all times in a fixed direction.

5 Claims, 8 Drawing Sheets

FIG. 8

IRRADIATION DIRECTION CONTROL APPARATUS FOR VEHICLE LAMP

BACKGROUND OF THE INVENTION

The present invention relates to an apparatus for detecting change in the height of each of axle portions respectively corresponding to pairs of front and rear wheels of a vehicle and for controlling an irradiation direction of a lamp thereof according to change in the attitude thereof.

There is known an apparatus (what is called an automatic leveling apparatus) for automatically performing correction according to change in the running attitude of a vehicle so that the irradiation direction of a lamp (or headlamp) mounted to the vehicle is maintained in a fixed direction.

For example, there is known a conventional apparatus in which a vehicle height sensor is attached to each of front and rear wheels of the vehicle. Alternatively, there is known another conventional apparatus in which a vehicle height sensor is attached only to one of the front and rear wheels thereof. Such an apparatus obtains a change in the pitch angle (or pitching angle) of the vehicle according to detection information acquired by the height sensor, and controls the irradiation direction of the lamp or controls the height of a cut-off line in a low beam light distribution pattern by driving a reflecting mirror provided in the headlamp so as to cancel the change in the pitch angle.

Further, preferably, the control response of an automatic leveling apparatus is changed according to the magnitude of an acceleration of a vehicle. Thus, when the magnitude of the acceleration is large, fast control is performed. Conversely, when the magnitude of the acceleration is small, slow control is performed.

Further, when the irradiation direction of the lamp unnecessarily largely changes during the vehicle drives on a rough road, the visibility may be reduced. In view of control stability, such a conventional apparatus employs a moving average method of setting a definite time (hereunder referred to as a "detecting window") correspondingly to vehicle height data collected for every constant period (or sampling period) or to pitch angle data based on the height data and computing an average value of such data in the definite time (incidentally, as time elapses, each of the starting and end points of the detecting window moves by a unit time). The control of the irradiation direction of the lamp is performed according to this moving average value. Thus, attention is paid to the prevention of the irradiation direction control from being too sensitive about change in the vehicle height.

However, in the case that the time width of the detecting window for moving-averaging is not set at a relatively large value in such a conventional apparatus, stable detection data cannot be obtained. Thus, it takes time to calculate a moving average value. For instance, even when significant change in the vehicle height occurs during the moving average value is calculated, such change is neglected by the averaging. This may result in followability deterioration and control delay, and may cause glare.

SUMMARY OF THE INVENTION

Accordingly, an object of the present invention is to manage both the stabilization of control of the irradiation direction of a vehicular lamp and the prevention of an occurrence of response delay.

To achieve the foregoing object, according to the present invention, there is provided an irradiation direction control apparatus for a vehicular lamp. This apparatus is adapted to acquire data representing a pitch angle of a vehicle by detecting change in the height of an axle portion corresponding to a pair of front wheels or rear wheels or each of the pairs of front and rear wheels of the vehicle and to change the irradiation direction of a vehicular lamp according to change in the attitude of the vehicle in such a manner as to cancel change in the pitch angle. The apparatus comprises irradiation control means that is operative to calculate a moving average value of data, which represents the change in the height of the axle portion or represents a pitch angle, every constant time period, and to obtain a moving average value of the calculated moving average value, and to control the lamp according to a control signal, which is based on the obtained moving average value, in such a manner as to maintain the irradiation direction in a fixed direction.

Thus, according to the present invention, a moving-averaging process is performed on the average value obtained by a first moving-averaging process performed on data representing change in the height of the axle portion or representing the pitch angle. Thus, the apparatus of the present invention can obtain data, which little varies even in the case of using a detecting window that has a relatively short time width, and can reduce control delay. That is, the present invention eliminates the necessity for enhancing stability by setting the time width of the detecting window at a relatively large value, which is necessary in the case of performing a conventional method. Consequently, the apparatus of the present invention can obtain stable data as an effect of performing a plurality of stages of moving-averaging.

DETAILED DESCRIPTION OF THE PREFERRED EMBODIMENTS

Figure 1:
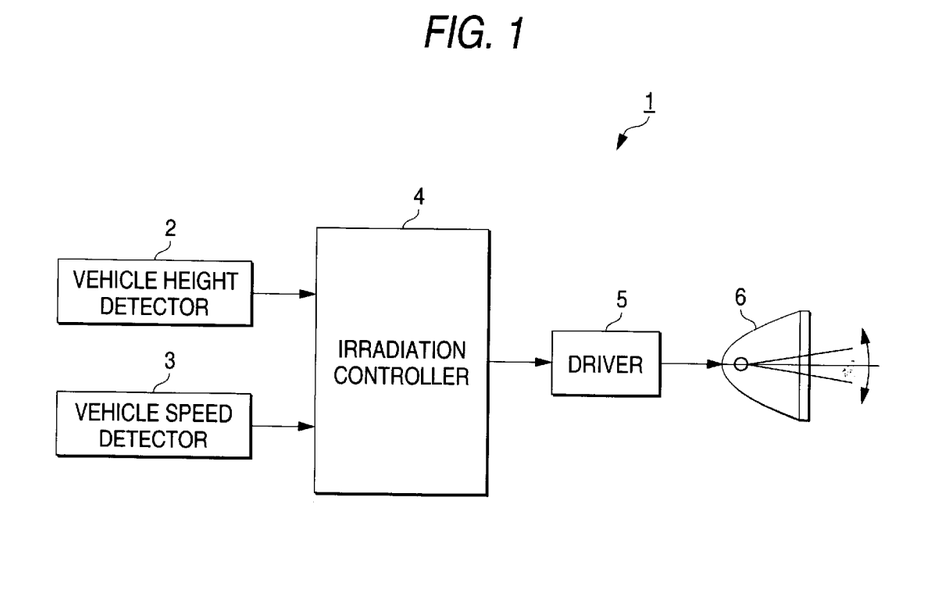
FIG. 1 is a block diagram illustrating the basic configuration of an apparatus of the present invention.

FIG. 1 illustrates the basic configuration of an apparatus of the present invention. This apparatus changes the irradiation direction of a lamp according to change in the attitude of a vehicle by detecting change in the height of each of axle portions provided for a pair of front wheels or rear wheels or each of the pairs of front and rear wheels.

An irradiation direction control apparatus 1 has a vehicle height detecting means 2, a vehicle speed detecting means 3 for detecting a running speed of the vehicle, an irradiation control means 4, and a drive means 5. A pitch angle of the vehicle is obtained according to a vehicle height detecting signal outputted from the vehicle height detecting means 2. The irradiation direction of a lamp 6 is controlled in such a manner as to be maintained in a fixed direction even when the attitude of the vehicle changes in the frontward and rearward directions thereof (that is, data representing the pitch angle of the vehicle is obtained by detecting change in the height of the vehicle, and then the irradiation of the lamp is corrected according to the change in the attitude of the vehicle in such a way as to cancel change in the pitch angle). Incidentally, the lamp 6, whose irradiation direction is controlled by the irradiation control means 4 through the drive means 5, is, for example, a headlamp, a fog lamp, or a cornering lamp in the case that the lamp 6 is an automotive lamp.

The vehicle height detecting means 2 is provided for detecting change in the height of the axle portion corresponding to the pair of front wheels or rear wheels or each of the pairs of front and rear wheels. A vehicle height detecting signal represents basic information for determining the stop attitude and the running attitude of the vehicle. Incidentally, for example, the following methods are cited as examples of a vehicle height detecting method.

(i) A method of measuring the distance between the vehicle height detecting means 2 and a road surface by using detecting waves, such as ultrasonic waves and laser light waves; and (ii) A method of detecting an amount of expansion of a suspension by providing a vehicle height sensor as the vehicle height detecting means 2 for detecting upward and downward variation in the height of the axle corresponding to the pair of front wheels or rear wheels.

The vehicle speed detecting means 3 is provided for detecting the running speed of the vehicle, and used for obtaining by performing first differential or difference on the detecting signal with respect to time. That is, in the latter case, the vehicle speed detecting means 3 constitutes a detecting means for detecting an acceleration of the vehicle by performing differential on detection information concerning a vehicle speed. Needless to say, an acceleration detecting means for directly detecting the acceleration of the vehicle may be used.

The irradiation control means 4 receives the detecting signals from the vehicle height detecting means 2 and the vehicle speed detecting means 3 and then performs the following control operations.

(A) First and second moving-averaging operations to be performed on detection data (namely, a calculation of a moving average value); and (B) An irradiation direction control operation to be performed according to data representing the moving average value obtained by performing the operations (A).

First, regarding the operations (A), the following two stages of processing are performed.

(I) Calculation of a moving average value is performed on (first) data, which represents change in the vehicle height or the pitch angle of the vehicle, every constant time period; and (II) Calculation of a moving average value is further performed on second data that is the moving average value obtained by the processing (I).

In the processing (I), first, a detecting window (whose time width is designated by "T1") is set for performing moving-averaging on data acquired by the vehicle height detecting means every constant sampling period or on data, which represents a pitch angle of the vehicle and obtained from the acquire data. Then, a moving average value of such data obtained in the time period T1 (namely, the time period between a current moment and a moment preceding the current moment by a time width T1) is calculated.

Subsequently, in the processing (II), another detecting window (whose time width is designated by "T2" and determined so that T2>T1) is set for moving-averaging time series data representing the moving average values obtained by the processing (I). Then, a moving average value of the data included within a time period T2 is calculated.

Incidentally, it is considered that the number of times of performing the moving averaging operation (or the degree of order in which the moving averaging operation is performed) is increased and that thus, third, forth, . . . , and nth moving-averaging operations are performed (additionally, T1<T2<T3< . . . <$T_{n-1}$<$T_n$ where "$T_n$" denote the time width of an nth detecting window for performing an nth moving averaging operation). However, the higher the degree of order is uselessly increased, strain put on a calculation processing unit becomes that much higher. Therefore, it is desirable from the viewpoint of control response that the degree of order, at which the moving averaging operation is performed, is as low as possible (incidentally, the lowest degree of order is 2).

In the operation (B), the irradiation direction of the lamp is controlled by being corrected according to a control signal, which is based on the moving average value obtained by the operation (A), in such a manner as to cancel change in the irradiation direction thereof and to be maintained in a fixed direction. That is, such a control operation (B) is similar to that performed in the conventional apparatus, except what the control signal is based on. In the operation (B), change in the pitch angle, which is caused in response to change in the attitude of the vehicle, is determined, and subsequently, the irradiation direction of the lamp is corrected in such a way as to cancel the change in the pitch angle. For instance, in the case that the attitude of a front portion of the vehicle changes in a relatively slightly upward (or downward) direction, the irradiation direction of the lamp attached to the front portion of the vehicle is changed slightly upwardly (or downwardly) with respect to a horizontal surface when no correction is performed on the attitude of the front portion of the vehicle. Thus, the control operation is performed by correcting the irradiation direction in such a way as to change in the downward (or upward) direction so that the irradiation direction is maintained in a fixed direction.

To compare between the control operation according to the present invention and the conventional control operation, the following three modes are described hereinbelow by way of example.

(m1) A control mode in which the response is fastest (the time width of a corresponding detecting window is designated by "t1").

(m2) A control mode in which the response is somewhat fast (the time width of a corresponding detecting window is designated by "t2"); and (m3) A control mode in which the response is slow (the time width of a corresponding detecting window is designated by "t3").

The mode (m1) corresponds to the case that the acceleration of the vehicle is high. In this mode, it is necessary that the irradiation direction of the lamp of the vehicle is controlled rapidly in response to change in the attitude thereof. The mode (m2) corresponds to the case where the acceleration of the vehicle is lower than that of the vehicle in the mode (m1). However, in the mode (m2), the irradiation direction of the lamp is controlled with somewhat fast response. Further, the mode (m3) corresponds to the case that the acceleration of the vehicle is low. In this mode, the irradiation direction of the lamp is controlled in such a way as to prevent the irradiation direction thereof from being uselessly changed in response to the change in the attitude thereof. Incidentally, the following relation among the time widths holds in these modes:

$$t1 < t2 < t3.$$

In the case of the conventional control apparatus, the detecting windows having different time widths are set in these modes, respectively. Thus, the conventional apparatus has drawbacks in that a control target value is affected by past data in, for instance, the slow control mode (m3), during the time period t3 at the longest, and that a control delay occurs because a moving average value is definitely determined when this time period elapses (incidentally, the longer the time period t3, the longer the control delay).

Thus, in the mode (m3), a first moving average calculation is performed by setting a detecting window whose time width is shorter than t3. Then, a second moving average calculation is performed by setting a detecting window whose time width is far shorter than t3. For example, the time width T1 of the detecting window to be used for performing the first moving average operation is set so that T1=t2. Moreover, the time width T2 of the detecting window to be used for performing the second moving average operation is set within a range given so that t2<T2<t3. The setting of the time width of the former detecting window enables the use of the detecting window in the control mode (m2) in which the response is somewhat fast. Moreover, the second moving average calculation is performed. Thus, although the detecting windows having relatively short time widths are used, low-variation stable data can be acquired. Consequently, the control delay can be reduced. In other words, regarding variability of data, the conventional method can only enhance the stability of data (that is, obtain low variation data strings) by setting the time width of the detecting window at a somewhat large value. However, according to the present invention, low variation data strings can be obtained by the effect of the second moving average operation, in spite of using only detection data obtained in a relatively short time (incidentally, in the case of setting the time width T2 at a value, which is nearly half of the time t3, the apparatus of the present invention can obtain data having stability of the same level as that of data acquired in the case of performing only the first moving average operation using the detecting window, whose time width T1 is set so that T1=t3). Additionally, the response delay is reduced (because of the fact that the time width of the detecting window can be set so that T2<t3).

Figure 2:
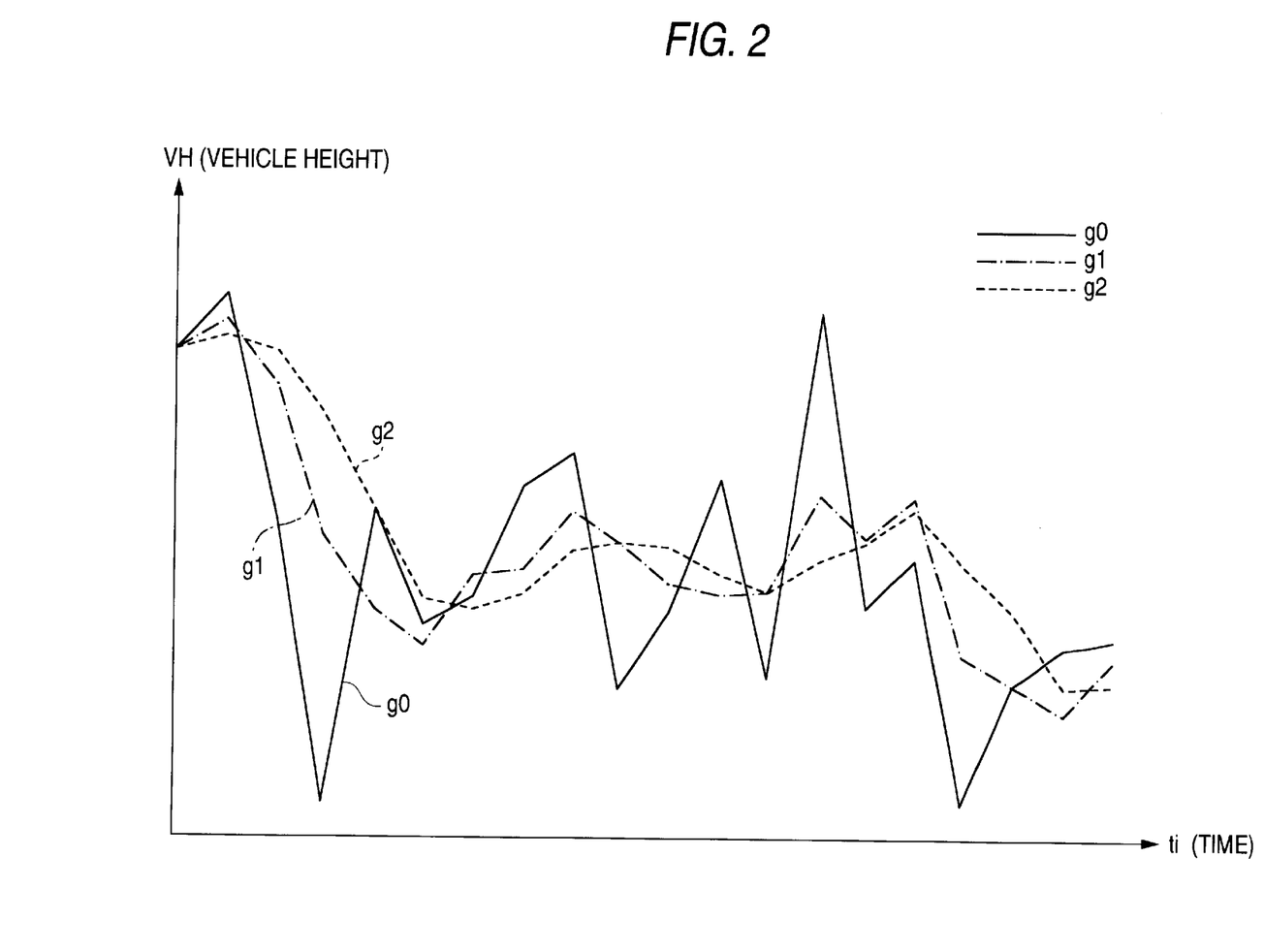
FIG. 2 is a graph illustrating a moving average calculation.
Figure 3:
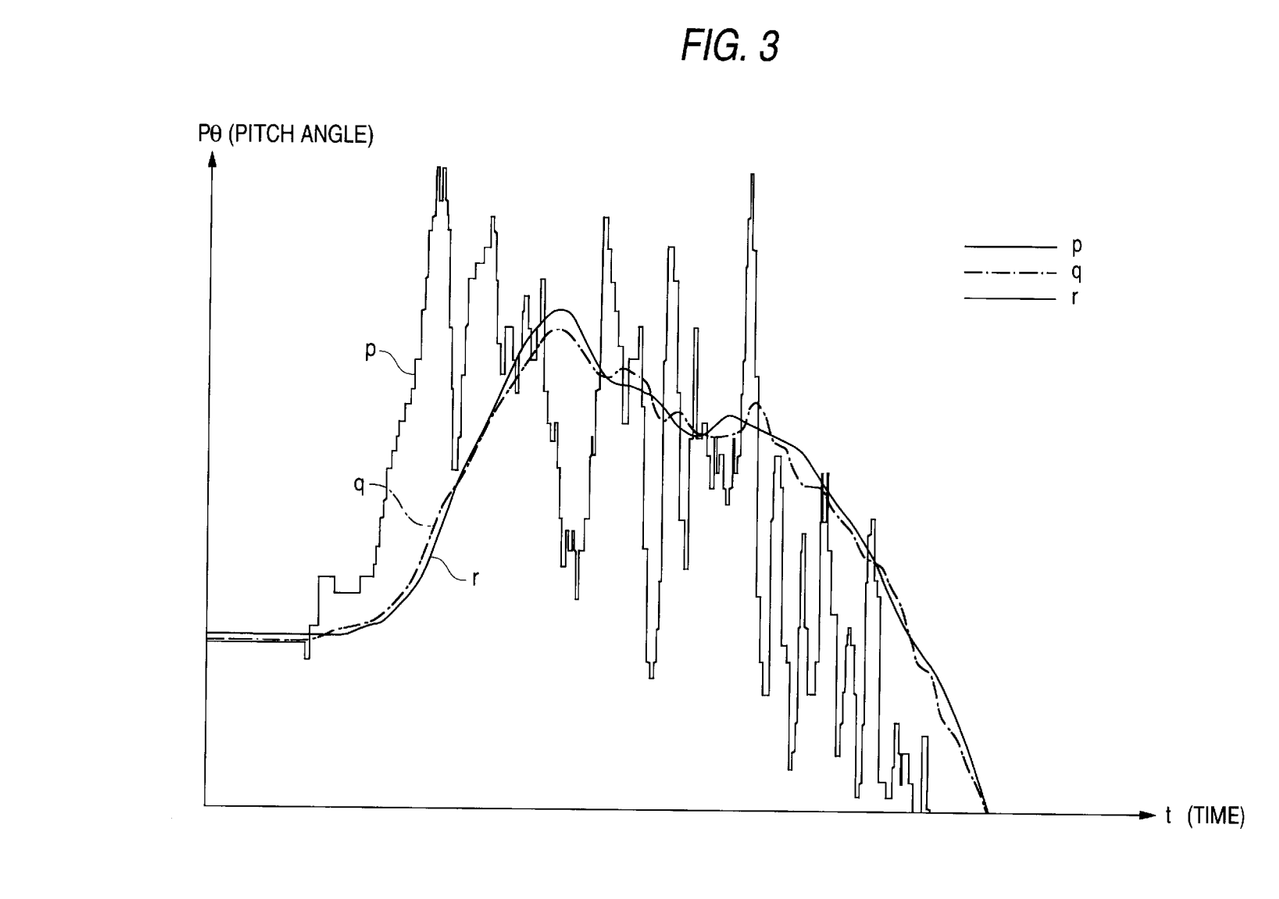
FIG. 3 is a graph illustrating change in a pitch angle and in a calculated moving average value of the pitch with respect to time.

FIGS. 2 and 3 are graphs illustrating the present invention.

In FIG. 2, ordinates represent values "VH" of the vehicle height, which are indicated by a string of vehicle height data that are obtained by the vehicle height detecting means 2 at uniform time intervals. Abscissas represent time ti, which is expressed in terms of a time index (whose value increases in a direction in which time elapses) associated with each of data elements of the string, which correspond to discrete time slots, respectively. Incidentally, in this graph, a curve "g0" indicates change in vehicle height data with respect to time. Further, a curve "g1" indicates change in the moving average value data obtained by the first moving average operation. Moreover, a curve "g2" indicates change in the moving average value data obtained by the second moving average operation.

This graph shows that phase delays of the data indicated by the curves "g1" and "g2" are caused with respect to the phase of the data indicated by the curve "g0", that the phase delay of the data indicated by the curve "g2" is larger than the phase delay of the data indicated by the curve "g1", and that the range of variation in the data indicated by the curve "g2" is narrower than the range of variation in the data indicated by the curve "g1".

FIG. 3 illustrates an example of change in the pitch angle of the vehicle with respect to time. In FIG. 3, abscissas represent time "t", while ordinates represent the pitch angle Pθ. In this graph, a curve "p" indicates change in the pitch angle with respect to time, which is represented by pitch angle data obtained every predetermined sampling time (in this embodiment, 0.1 sec.), and a curve "q" indicates change in the moving average value of the pitch angle data, which is indicated by the curve "p", in the case of using the detecting window, whose time width is set at 2.5 sec. Further, a curve "r" indicates change in the second moving average value with respect to time, which is obtained by further performing the second moving average operation using the detecting window, whose time width is set at 2 sec., after the calculation of the first moving average values of the pitch angle data indicated by the curve "p" is performed by using the detecting window, whose time width is set at 0.5 sec.).

The comparison between the curves "q" and "r" reveals that the response in the case corresponding to the curve "r" is more stable than the response in the case corresponding to the curve "q" (that is, to obtain stability, which has the same level as of the stability obtained in the case corresponding to the curve "r", it is necessary that the time width of the detecting window used in the case corresponding to the curve "q" is set at a larger value.

Incidentally, the present invention is effective in the mode (m3) in the case that the acceleration of the vehicle is less than a value determined as a threshold value. However, the foregoing description of the mode classification exemplifies the basic classification and does not mean that the control modes should be established according to the magnitude of the acceleration. As will be described later, various kinds of mode classification according to the combination of the magnitude of the acceleration and the vehicle speed range maybe employed.

The irradiation direction of the lamp 6 is controlled according to a control signal sent from the irradiation control means 4 to the drive means 5. There are two kinds of methods for controlling the irradiation direction thereof. One is a method of directing the whole irradiation light rays in a predetermined direction. The other is a method of directing a part of irradiation light rays in a predetermined direction. Examples of the former method are to change the direction of an axis of irradiation of the lamp by turning the entire lamp around an axis of rotation thereof, and to change the direction of an optical axis of an optical system by controlling the attitude of the constituent members, such as a reflecting mirror, a lens, a light source, and a light shielding member, of the lamp. Further, examples of the latter method are to change the direction of an axis of irradiation of a specific lamp of an apparatus having a plurality of lamps so as to partially change the direction of irradiation of light (for example, in the case that headlamps, fog lamps and cornering lamps are provided in an automobile, only one or two kinds of the lamps among the three kinds of lamps are changed), and to control the attitude of one or a plurality of constituent members of the lamp (for instance, a reflecting mirror device is constituted by a fixed reflecting mirror and a movable reflecting mirror, and the direction of an optical axis of the movable reflecting mirror is directed in a desired direction).

Thus, according to the present invention, moving average values of data representing change in the height of the axle portion corresponding to the pair of wheels of the vehicle or representing the pitch angle there of are calculated by setting a detecting window that has a fixed time width T1. Then, a moving average value of the calculated moving average values is obtained by setting a detecting window that has a time width T2. Subsequently, a control signal based on the obtained moving average value is generated and then sent to the drive means 5. The irradiation direction of the lamp 6 is thus controlled in such a manner as to be maintained in a fixed direction even when the attitude of the vehicle changes. Consequently, the apparatus of the present invention can manage both the assurance of stability of the irradiation direction control, which is ensured according to low variation data, and the reduction in the control delay.

FIGS. 4 to 8 illustrate an embodiment of the irradiation direction control apparatus for a vehicular lamp (namely, an automatic leveling apparatus).

Figure 4:
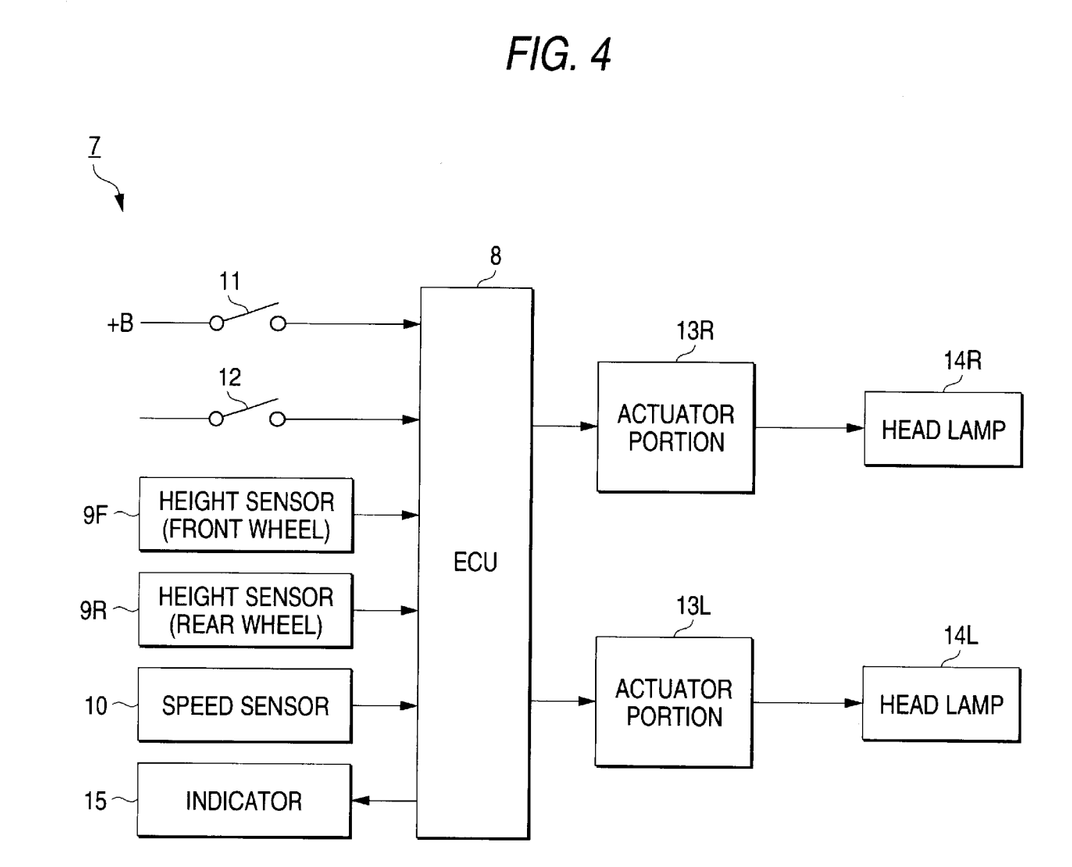
FIG. 4 illustrates an embodiment of the present invention and is a diagram illustrating the configuration of an automatic leveling apparatus.

FIG. 4 schematically illustrates the configuration of an embodiment of an irradiation direction control apparatus 7. Information is inputted from the following detecting means and the following instructing means to an ECU (Electronic Control Unit) 8 serving as a controller of the irradiation direction control apparatus 7 (incidentally, numerals and characters described in the following parentheses designate reference characters).

(a) Front wheel vehicle height sensor (9F) and Rear wheel vehicle height sensor (9R);
(b) Vehicle speed sensor (10);
(c) Power supply switch (11); and
(d) Headlamp switch (12).

Incidentally, the power supply switch 11 is provided therein for supplying electric power to the ECU 8 and actuator portions (to be described later) by being closed. Further, the headlamp switch 2 is operative to transmit turn-on and turn-off instructing signals, in response to which the headlamp is turned on and off, to the ECU 8.

A control signal is sent from the ECU 8, into which a microcomputer is incorporated, to the actuator portions 13R and 13L, so that the irradiation directions of the headlamps 14R and 14L are controlled (the letters "R" and "L" added at the ends of these reference characters designate the right-hand side of the vehicle and the left-hand side thereof, respectively). Although not shown in the drawings, a drive circuit for controlling the rotation of a motor according to a control signal sent from the ECU 8 is provided in each of the actuator portions corresponding to the drive means 5. For example, the irradiation direction of each of the headlamps is controlled by inclining the reflecting mirror provided in each of the headlamps in a vertical plane, which includes the optical axis thereof, in such a manner as to be directed in a desired direction. The indication of a current leveling state is performed in response to a signal sent from the ECU 8 to an indicator 15.

Figure 5:
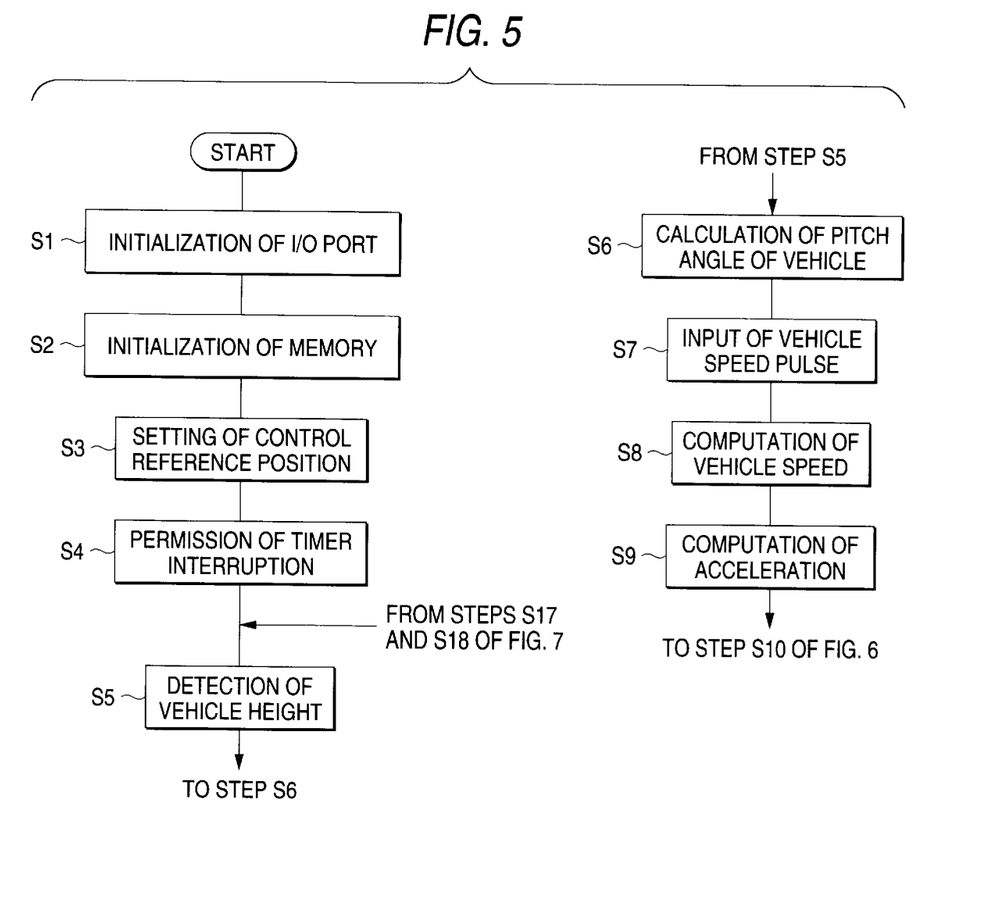
FIG. 5 illustrates an example of a control process and is a flowchart illustrating a beginning part of the control process.
Figure 6:
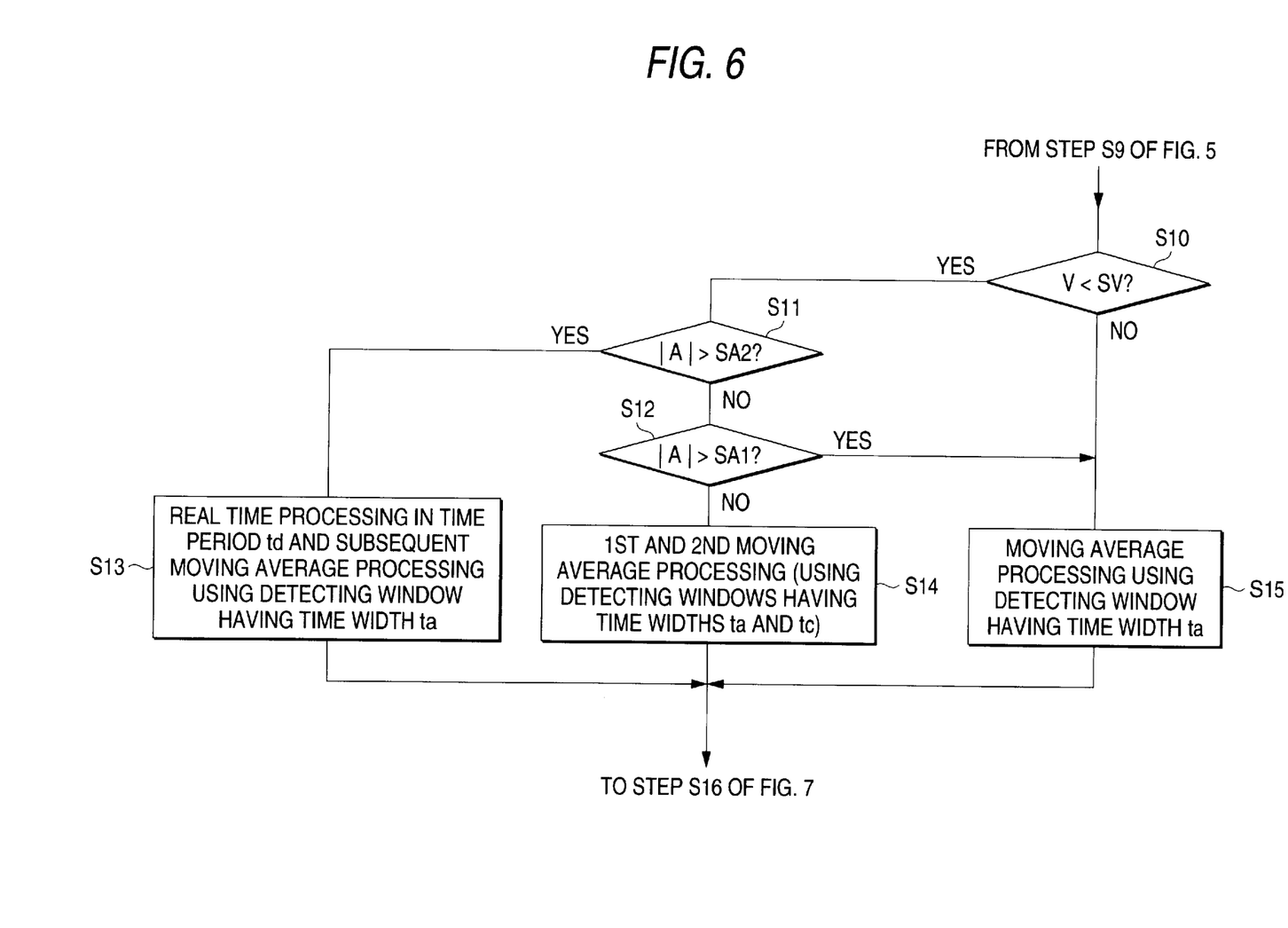
FIG. 6 is a flowchart illustrating a middle part of the control process.
Figure 7:
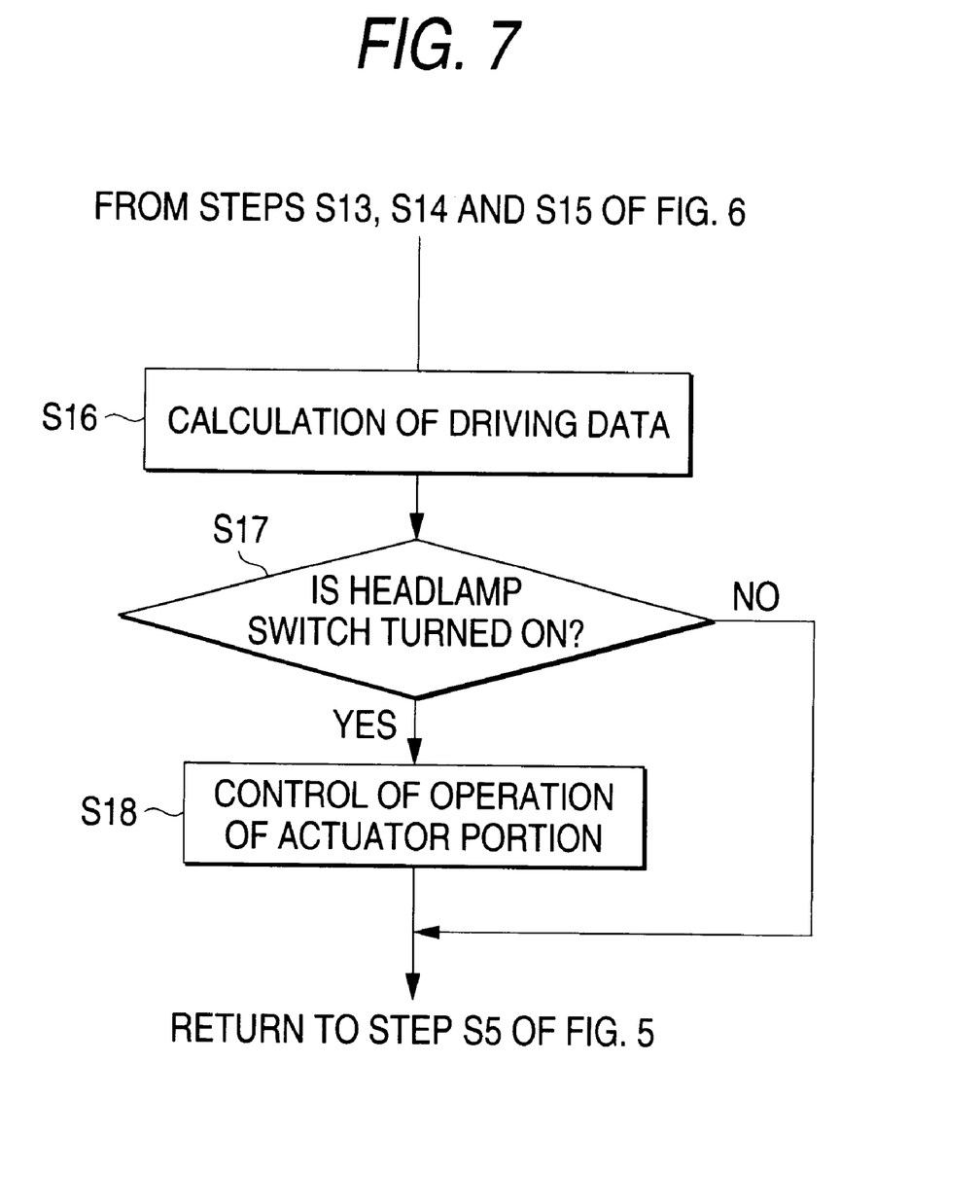
FIG. 7 is a flowchart illustrating the last part of the control process.

FIGS. 5 to 7 are flowcharts illustrating a flow of a primary process to be performed in the ECU 8. First, in step S1, the initialization of an I/O (input/output) port is performed. Then, in the next step S2, the initialization of a memory is performed. Subsequently, in the next step S3, the setting of a control reference position is performed, that is, the setting of the initial positions of the actuator portions 13R and 13L (namely, the locating of these actuator portions at the home positions thereof is performed).

Then, control advances to step S4, whereupon a timer interruption to a CPU (Central Processing Unit) provided in the ECU 8 is permitted. Subsequently, in the next step S5, the height of the vehicle is detected. That is, detection data obtained from the vehicle height sensors 9F and 9R are inputted to the ECU 8.

Then, in the next step S6, the pitch angle of the vehicle is calculated according to the vehicle height data. Subsequently, in the next step S7, a detection signal (namely, a pulse signal) is inputted from the vehicle speed sensor 10 to the ECU 8. Incidentally, this is performed by handling an interruption.

Instep S8, a vehicle speed (designated by "V") is obtained by performing a vehicle speed calculation. Then, in the next step S9, an acceleration (designated by "A") is calculated by performing a differential (or difference) calculation. Thereafter, control proceeds to step S10 shown in FIG. 6. Incidentally, the acceleration is easily obtained by dividing an amount of change in the speed by a time interval needed for the change.

Steps S10 to S12 relate to conditional branch operations to be performed correspondingly to the classified control modes. Before describing these steps, a control operation to be performed in each of the control modes is described hereinbelow by using a control map illustrated in FIG. 8.

Figure 8:
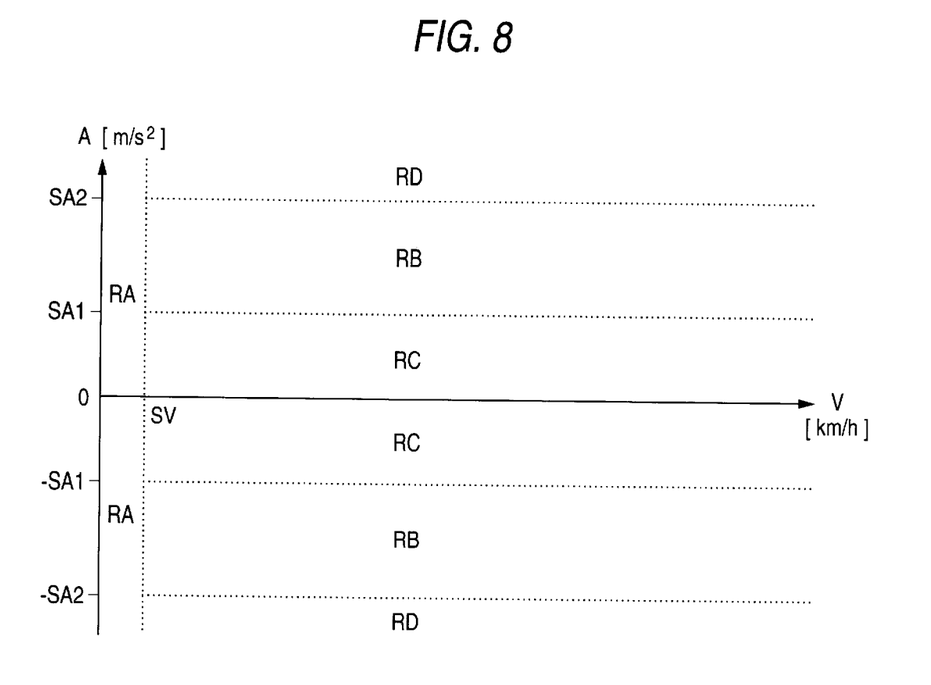
FIG. 8 is a diagram illustrating a control map.

FIG. 8 shows the following control regions (incidentally, a symbol "|X|" designates an absolute value of X). In FIG. 8, abscissas represent the vehicle speed "V", while ordinates represent the acceleration "A" of the vehicle.

Region "RA" ($0 \leq V < SV$);
Region "RB" ($SV \leq V$ and $SA1 < |A| \leq SA2$);
Region "RC" ($SV \leq V$ and $|A| \leq SA1$); and
Region "RD" ($SV \leq V$ and $|A| > SA2$).

First, in the regions RA and RB, the irradiation direction of the lamp is controlled according to a result of a moving average calculation performed by using a detecting window set in such a manner as to have a time width ta. When the time width ta is set at a small value, this control operation is set so that the response is relatively fast.

Further, in the region RD, the control operation is performed in the time td (<ta) according to a result of real time processing (adapted to reflect sampling data obtained every moment in a predetermined period, instead of reflecting an average value of data representing the pitch angle of the vehicle). Thereafter, the apparatus goes into a mode in which the control operation is performed according to a result of a moving average calculation using a detecting window that has a window width ta. This is owing to the necessity for increasing the control response at the mode transition in consideration of the fact that the magnitude of the acceleration is large in this region.

In the region RC, the magnitude of the acceleration is small. Thus, a first moving average calculation is performed by using a detecting window that has a time width ta. Then, a second moving average calculation is performed on the values, which are obtained by the first moving average calculation, by using a detecting window that has a time width tc (>ta). The irradiation direction control operation is performed according to a result of this second moving average calculation.

In the case of determining which of the regions illustrated in FIG. 8 a current vehicular running state belongs to, first, it is decided in step S10 shown in FIG. 6 whether the speed V is less than a threshold value SV (for example, a value within a range of 1 to 3 km per hour). If the decision is affirmative, control advances to step S15. Conversely, if the speed V is equal to or more than the threshold value SV, control proceeds to step S11.

In step S11, it is decided whether the absolute value |A| of the acceleration is larger than a threshold value SA2 (for instance, a value within a range of 3 to 5 m/s²). If the decision is affirmative, control advances to step S13. Conversely, if |A|≦SA2, control proceeds to step S12.

In step S12, it is decided whether the absolute value |A| of the acceleration is larger than a threshold value SA1 (for example, a value within a range of 1 to 3 M/s²). If the decision is affirmative, control advances to step S15. Conversely, if |A|≦SA1, control proceeds to step S14.

When control reaches step S13, the moving average calculation is performed by using a detecting window, which has a time width ta, after the real time processing is performed for a time period td, as described in the description of the control operation performed in the region RD.

Further, when control reaches step S14, a first moving average calculation is first performed by using a detecting window, which has a time width ta, and subsequently, a moving average calculation is performed on results of the first moving average calculation by using a detecting window, which has a time width tc, as described in the description of the control operation performed in the region RC.

Furthermore, when control reaches step S15, a moving average calculation is performed by using a detecting window, which has a time width ta, as described in the description of the control operations performed in the regions RA and RB.

In step S16 of FIG. 7, the ECU 8 calculates driving data for driving the actuator portions 13R and 13L according to the value calculated in step S13, S14, or S15. Then, control proceeds to the next step S17, whereupon it is decided whether the headlamp switch 12 is turned on. When the switch 12 is turned on, control advances to the next step S18, whereupon a control signal corresponding to the driving data is sent to the actuator portions 13R and 13L, so that the irradiation directions of the headlamps 14R and 14L are controlled. Subsequently, control returns to step S5 of FIG. 5. Conversely, when the headlamp 12 is not turned on, control skips step S18 and returns to step S5 of FIG. 5.

As is apparent from the foregoing description, according to the present invention, the time width of the detecting window can be set at a small value when an average value of data representing change in the height of the axle portion or representing the pitch angle of a vehicle is calculated by performing a first moving average process thereon. Moreover, long stable data can be obtained by performing a second moving average process. Thus, an apparatus of the present invention can prevent an occurrence of glare by reducing control delay, as compared with the case of performing only the first moving average process by setting the time width of the detecting window at a relatively large value.

According to an embodiment of the present invention, favorably stable data can be acquired in the case that the magnitude of the acceleration of a vehicle is small. Moreover, there is no need for setting the time width of the detecting window at a relatively large value so as to obtain such stable data.

What is claimed is:

1. An irradiation direction control apparatus for a vehicular lamp, said apparatus adapted to acquire data representing a pitch angle of a vehicle by detecting change in height of an axle portion of at least one of front wheels and rear wheels, and to change an irradiation direction of a vehicle lamp according to change in attitude of said vehicle in such a manner as to cancel change in the pitch angle, said apparatus comprising:

irradiation control means which calculates a moving average value of data representing the change in the height of said axle portion or represents the pitch angle, every predetermined time period, obtains a second order moving average value of the calculated moving average value, and controls said lamp according to a control signal which is based on the obtained second order moving average value, in such a manner as to maintain the irradiation direction in a fixed direction.

2. The irradiation direction control apparatus for vehicular lamp according to claim 1, further comprising:

acceleration detecting means for detecting an acceleration of said vehicle by directly detecting an acceleration of the vehicle or differentiating vehicle speed detecting information with respect to time;

wherein when a value of the acceleration of said vehicle is low, said irradiation control means calculates a moving average value of data, which represents the change in the height of said axle portion or represents the pitch angle, every constant time period, and then obtains a second order moving average value of the calculated moving average value, and subsequently, controls said lamp according to a control signal, which is based on the obtained second order moving average value, in such a manner as to maintain the irradiation direction in a fixed direction.

3. An irradiation direction control apparatus for a vehicular lamp, comprising:

pitch angle detector which detects a pitch angle of said vehicle in running state; and irradiation controller which calculates a moving average value of the pitch angle every predetermined time period, obtains a second moving average value of the calculated moving average value, and controls said lamp according to a control signal which is based on the obtained second moving average value, in such a manner as to maintain the irradiation direction in a fixed direction.

4. The irradiation direction control apparatus as claimed in claim 3, wherein said pitch detector including at least one of an axle height detector which detects change in height of an axle at least one of front wheels and rear wheels.

5. The irradiation direction control apparatus as claimed in claim 4, further comprising:

acceleration detector which detects an acceleration of said vehicle by directly detecting an acceleration of the vehicle or differentiating vehicle speed detecting information with respect to time;

wherein when a value of the acceleration of said vehicle is low, said irradiation control means calculates a moving average value of data, which represents the change in the height of said axle portion or represents the pitch angle, every constant time period, and then obtains a second order moving average value of the calculated moving average value, and subsequently, controls said lamp according to a control signal, which is based on the obtained second order moving average value, in such a manner as to maintain the irradiation direction in a fixed direction.

* * * * *